United States Patent
Chu et al.

(10) Patent No.: US 7,333,292 B2
(45) Date of Patent: Feb. 19, 2008

(54) SEEK SERVO CONTROL METHOD FOR ADAPTING TO SUPPLY VOLTAGE VARIATION AND DISK DRIVE USING THE SAME

(75) Inventors: Sang-hoon Chu, Yongin-si (KR); Nam-guk Kim, Anyang-si (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/339,677

(22) Filed: Jan. 26, 2006

(65) Prior Publication Data

US 2006/0171063 A1    Aug. 3, 2006

(30) Foreign Application Priority Data

Jan. 28, 2005    (KR)    ................ 10-2005-0007981

(51) Int. Cl.
*G11B 5/596*    (2006.01)
(52) U.S. Cl. .................................. 360/78.06
(58) Field of Classification Search .......... 360/78.06, 360/78.07, 75, 77.05, 78.04, 78.09; 318/561; 361/160, 685; 369/44.11; 711/112
See application file for complete search history.

(56) References Cited

U.S. PATENT DOCUMENTS

| | | | | |
|---|---|---|---|---|
| 5,150,266 | A * | 9/1992 | Albert | 360/78.04 |
| 5,262,907 | A * | 11/1993 | Duffy et al. | 360/77.05 |
| 5,677,609 | A * | 10/1997 | Khan et al. | 318/561 |
| 5,907,859 | A * | 5/1999 | Shimada et al. | 711/112 |
| 6,208,497 | B1 * | 3/2001 | Seale et al. | 361/160 |
| 6,396,652 | B1 * | 5/2002 | Kawachi et al. | 360/75 |
| 6,744,590 | B2 * | 6/2004 | Chu et al. | 360/78.06 |
| 6,801,384 | B2 | 10/2004 | Chu et al. | 360/78.07 |
| 6,961,205 | B2 * | 11/2005 | Atsumi et al. | 360/78.06 |
| 2001/0043450 | A1 * | 11/2001 | Seale et al. | 361/160 |
| 2005/0185374 | A1 * | 8/2005 | Wendel et al. | 361/685 |
| 2006/0023576 | A1 * | 2/2006 | Takeda | 369/44.11 |
| 2006/0171091 | A1 * | 8/2006 | Seale et al. | 361/160 |

FOREIGN PATENT DOCUMENTS

| | | |
|---|---|---|
| JP | 05-258488 | 10/1993 |
| JP | 06-131829 | 5/1994 |
| JP | 06-251519 | 9/1994 |
| JP | 10-326470 | 12/1998 |
| JP | 2002-367307 | 12/2002 |

OTHER PUBLICATIONS

Notice to Submit Response issued by the Korean Patent Office in the corresponding Korean Application No. 10-2005-0007981 dated Jul. 20, 2005 (total of 4 pages).

* cited by examiner

*Primary Examiner*—Fred F. Tzeng
(74) *Attorney, Agent, or Firm*—Staas & Halsey LLP

(57) ABSTRACT

A seek servo control method and device for a disk drive device for performing seek servo control according to a variation in a power supply voltage for the disk drive. The seek servo control method includes: detecting a supply voltage for the disk drive; and adjusting a seek time according to a track seek length based on the detected supply voltage.

13 Claims, 6 Drawing Sheets

SEEK SERVO CONTROL METHOD FOR ADAPTING TO SUPPLY VOLTAGE VARIATION AND DISK DRIVE USING THE SAME

CROSS-REFERENCE TO RELATED APPLICATIONS

This application claims the benefit of Korean Patent Application No. 10-2005-0007981, filed on Jan. 28, 2005, in the Korean Intellectual Property Office, the disclosure of which is incorporated herein in its entirety by reference

BACKGROUND OF THE INVENTION

1. Field of the Invention

The present invention relates to a seek servo control method and device for a disk drive, and more particularly, to a seek servo control method and device for performing seek servo control according to a variation in a power supply voltage for the disk drive.

2. Description of the Related Art

In general, a disk drive, an example of a data storage apparatus, reads or writes data from or to a disk by using a magnetic head. As the disk drive has a tendency to have a high capacity, a high density, and a compact size, a bit per inch (BPI) in a rotational direction and a track per inch (TPI) in a radial direction of the disk drive become large. As a result, there is a demand for a highly accurate mechanism in the disk drive.

One of criteria for disk drive performance is a seek time. The seek time denotes a time taken to move a transducer from a current cylinder to a target cylinder when a disk drive writes or reads information.

A track seek is performed as follows. First, design position, velocity, and acceleration trajectories for a seek length are generated. Next, with reference to the design acceleration trajectory, errors between design position and velocity trajectories and real position and velocity trajectories are provided to a feedback process to generate a seek current. Finally, the generated seek current is applied to a voice coil motor (VCM) to move a transducer across tracks. These design trajectories are derived from their respective servo system models. For a variety of practical reasons, the servo system models are approximated to a simple ideal model. However, a real system is not equal to the simple ideal model due to various limitations. This is called a non-ideal problem. In order to avoid the non-ideal problem, there have been proposed several approaches for partially employing a non-ideal model into a real system and limiting performance of the real system.

A representative approach is a seek control technique disclosed in U.S. Pat. No. 6,801,384. The seek control technique is designed with supply voltage limitation to a sinusoidal seek servo algorithm which is disclosed in U.S. Patent Application Publication No. 2001/0050827.

In the seek control technique, a real supply voltage has a voltage tolerance of +/−10% of a standard supply voltage Vs. Therefore, the seek control system according to the voltage limitation should be designed in terms of 0.9 Vs of the most serious environment. As a result, there is a problem in that the seek performance deteriorates even in a standard voltage environment.

SUMMARY OF THE INVENTION

Additional aspects and/or advantages of the invention will be set forth in part in the description which follows and, in part, will be apparent from the description, or may be learned by practice of the invention.

The present invention provides a seek servo control method for adaptively adjusting a seek time according to a variation in a power supply voltage for a disk drive and performing optimal seek control based on the adjusted seek time and a disk drive using the seek servo control method.

According to an aspect of the present invention, there is provided a seek servo control method for a disk drive, including: detecting a supply voltage for the disk drive; and adjusting a seek time according to a track seek length based on the detected supply voltage.

According to another aspect of the present invention, there is provided a sinusoidal seek control method for a disk drive for adapting to a variation in a supply voltage for the disk drive, including: calculating a standard seek time based on a predetermined standard supply voltage according to a seek length in response to a seek command; calculating the variation in the supply voltage currently supplied to the disk drive with reference to the standard supply voltage; calculating a seek time adjustment ratio corresponding to the calculated variation in the supply voltage from a table listing a relation between the supply voltage and the seek time adjustment ratio; calculating a final seek time by multiplying the seek time adjustment ratio and the standard seek time; generating position, velocity and acceleration trajectories by substituting the final seek time in a sinusoidal seek servo equation; and performing track seek control by using the generated position, velocity and acceleration trajectories.

According to still another aspect of the present invention, there is provided a disk drive including: a disk storing information; a spindle motor rotating the disk; a transducer writing and reading information to or from the disk; a voice coil motor moving the transducer; a voltage detection unit detecting a supply voltage for the disk drive; and a controller adjusting a seek time according to a track seek length based on a voltage detected by the voltage detection unit in a track seek mode and applying the adjusted seek time to a track seek control routine to control a driving current for the voice coil motor.

According to another aspect of the present invention, there is provided a disk drive using a sinusoidal seek serve scheme, including: a disk storing information; a spindle motor rotating the disk; a transducer writing and reading information to or from the disk; a voice coil motor moving the transducer; a voltage detection unit detecting a supply voltage for the disk drive; a memory storing a first table listing a relation between a seek length and a seek time based on a predetermined standard supply voltage and a second table listing a relation between a supply voltage and a seek time adjustment ratio; and a controller, the controller determining the standard seek time by using the first table according to the seek length based on the standard supply voltage; determining the seek time adjustment ratio corresponding to a difference between the standard supply voltage and the detected supply voltage by using the second table; calculating a final seek time by multiplying the determined seek time adjustment ration and the determined standard seek time; and controlling a driving current for the voice coil motor by using position, velocity and acceleration trajectories generated based on the final seek time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
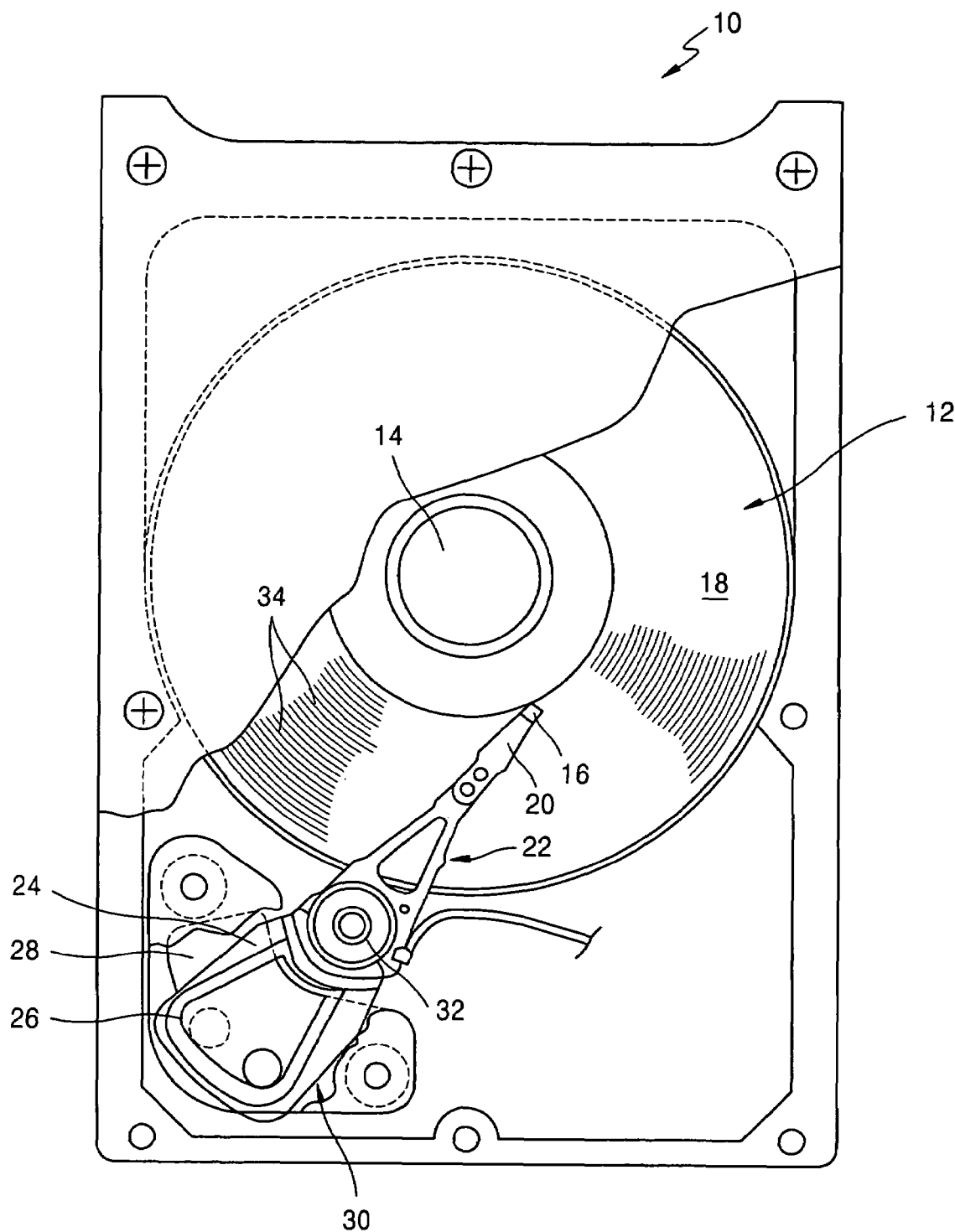
FIG. 1 is a top view showing a disk drive according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention is adapted to a disk drive for moving a transducer along a sinusoidal acceleration trajectory limited by a certain voltage across a disk surface. In particular, a seek time corresponding to a given seek length is based on limitation to a power voltage supplied to a voice coil motor (VCM) other than limitation to a current.

The transducer is integrated in a slider which is incorporated into a head gimbal assembly (HGA). The HGA is attached to an actuator arm for moving the transducer across the disk surface. Movement of the actuator arm and the transducer is controlled by a controller. The controller uses a seek routine and a servo control routine to move the transducer from a current track to a new track.

FIG. 1 shows a construction of a disk drive 10. The disk drive 10 includes at least one magnetic disk 12 which is rotated by a spindle motor 14. In addition, the disk drive 10 includes a transducer 16 located adjacent to a disk surface 18.

The transducer 16 can write and read information on the magnetic disk 12 by magnetizing the magnetic disk 12 and sensing the magnetic field of the magnetic disk 12, respectively. Typically, the transducer 16 is associated with the surface of the magnetic disk 12. Although a single transducer 16 is shown and described, it should be understood that the transducer is divided into a write transducer for magnetizing the magnetic disk 12 and a separate read transducer for sensing the magnetic field of the magnetic disk 12. The read transducer may be made of a magneto-resistive (MR) material.

The transducer 16 may be integrated into the slider 20. The slider 20 may be constructed to create an air bearing between the transducer 16 and the disk surface 18. The slider 20 may be incorporated into the HGA 22. The HGA 22 may be attached to the actuator arm 24 which has a voice coil 26. The voice coil 26 may be located adjacent to a magnet assembly 28 to define a VCM 30. A current applied to the voice coil 26 generates a torque for rotating the actuator arm 24 about a bearing assembly 32. Rotation of the actuator arm 24 moves the transducer 16 across the disk surface 18.

Information is typically stored in circular tracks 34 of the magnetic disk 12. In general, each track 34 is divided into a plurality of sectors. Each sector may include a data field and an identification field. The identification field may contain gray code information which identifies the sector and track (cylinder). The transducer 16 is moved across the magnetic surface 18 to write or read information stored in another track. The movement of the transducer between different tracks is generally referred to as a seek routine.

Figure 2:
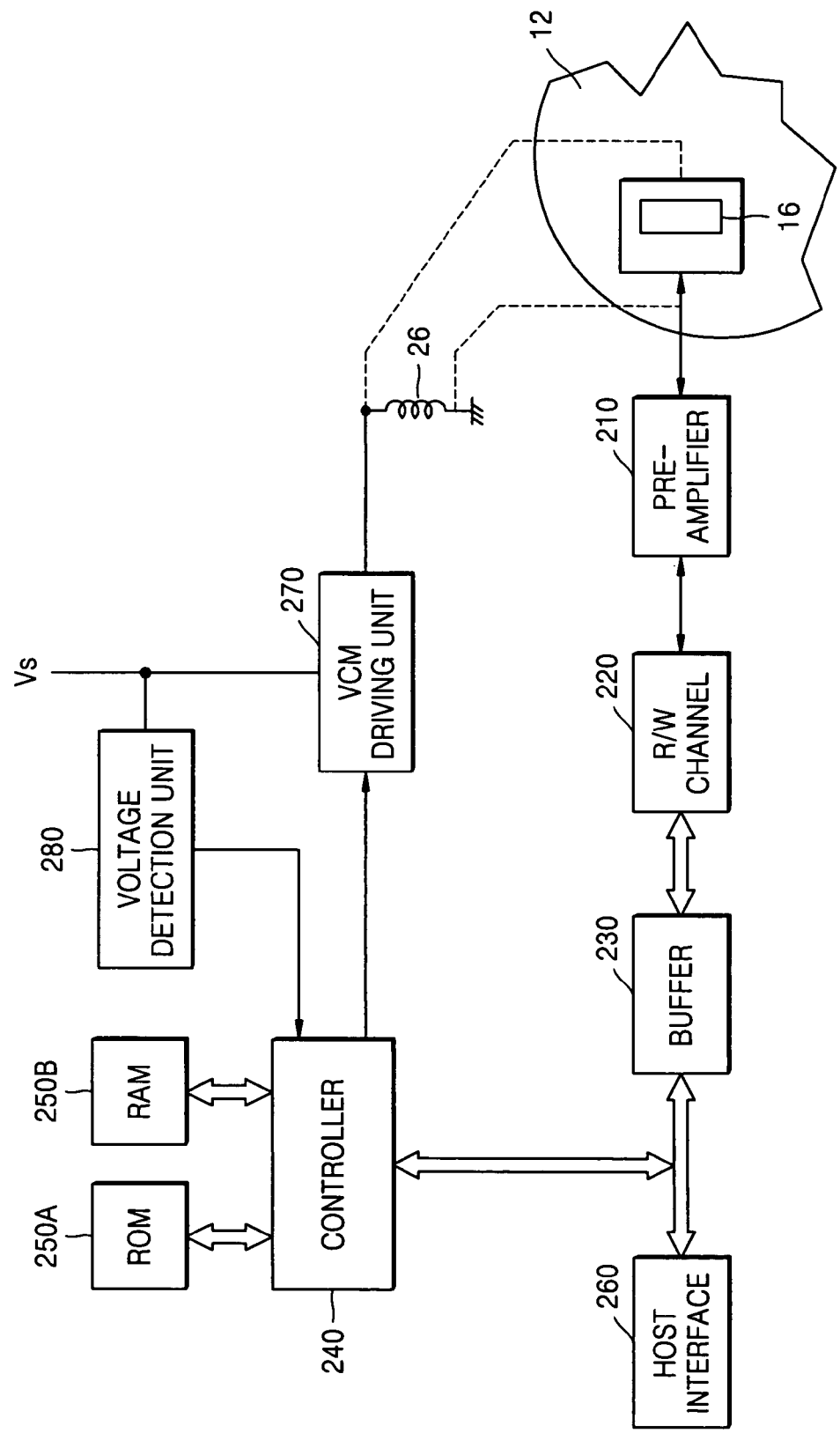
FIG. 2 is a circuit diagram of an electronic system for controlling the disk drive according to the present invention.

As shown in FIG. 2, a disk drive according to the present invention includes a disk 12, a transducer 16, a pre-amplifier 210, a read/write (R/W) channel 220, a buffer 230, a controller 240, a ROM 250A, a RAM 250B, a host interface 260, a VCM driving unit 270, and a voltage detection unit 280.

The ROM 250A stores various commands and data used by the controller 240 to perform software routines. As one of the software routines, there is a seek control routine for moving the transducer 16 from one track to another track. In addition, for example, the ROM 250A stores equations used to generate sinusoidal position, velocity, and acceleration trajectories of a limited voltage.

In particular, the ROM 250A stores a first table listing a relation between a seek time and a seek length based on a standard supply voltage and a second table listing a relation between the supply voltage and a seek time adjustment ratio. The first and second tables will be described later in detail.

The RAM 250B stores information necessary for initially driving the disk drive. The information stored in the RAM 250B is read from the ROM 250A or the magnetic disk 12.

The voltage detection unit 280 periodically detects a supply voltage Vs for the disk drive. The voltage detection unit 280 is not shown in detail. The voltage detection unit 280 may detect the supply voltage Vs by using a voltage divider circuit and an analog/digital converter circuit. The supply voltage Vs detected by the voltage detection unit 280 may be a supply voltage for the VCM or a power AMP supply voltage for a VCM driving unit.

The controller 240 analyzes commands received through the host interface 260 from a host system (not shown) and performs controls corresponding to the result of command analysis. The controller 240 applies a control signal to the VCM driving unit 270 to control excitation of the VCM 30 and motion of the transducer 16.

Now, a general operation of the disk drive will be described.

In a data read mode of the disk drive, the read transducer of the transducer 16 senses an electrical signal from the magnetic disk 12. The pre-amplifier 210 primarily amplifies the electrical signal. Next, in the write/read channel 220, an automatic gain control circuit (not shown) performs gain control to amplify the pre-amplified signal up to a predetermined level. The predetermined-level amplified signal (analog signal) is encoded into a digital signal, so that the digital signal can be read by a host system. In addition, the digital signal is converted into a data stream. The data stream is temporarily stored in a buffer 230, and then, transmitted to the host system through the host interface 260.

In a data write mode of the disk drive, data is received from the host system through the host interface 260 and temporarily stored in the buffer 230. The data stored in the buffer 230 is sequentially output and converted into a binary data stream (suitable for the write channel) by the read/write channel 220. Next, the write transducer of the transducer 16 writes data on the magnetic disk 12 by using a write current amplified by the pre-amplifier 210.

Now, the seek control routine according to the present invention executed by the controller 240 will be described in detail.

When the track seek command is input, the controller 240 determines a standard seek time according to a seek length based the an initially determined standard supply voltage Vo by using the first table stored in the ROM 250A, determines the seek time adjustment ratio corresponding to a difference v between the standard supply voltage Vo and the voltage detected by the voltage detection unit 280 by using the second table stored in the ROM 250A, calculates a final seek time by multiplying the seek time adjustment ratio and the standard seek time, generates position, velocity and acceleration trajectories based on the calculated final seek time, and performs controlling driving current of the VCM 30.

Figure 3:
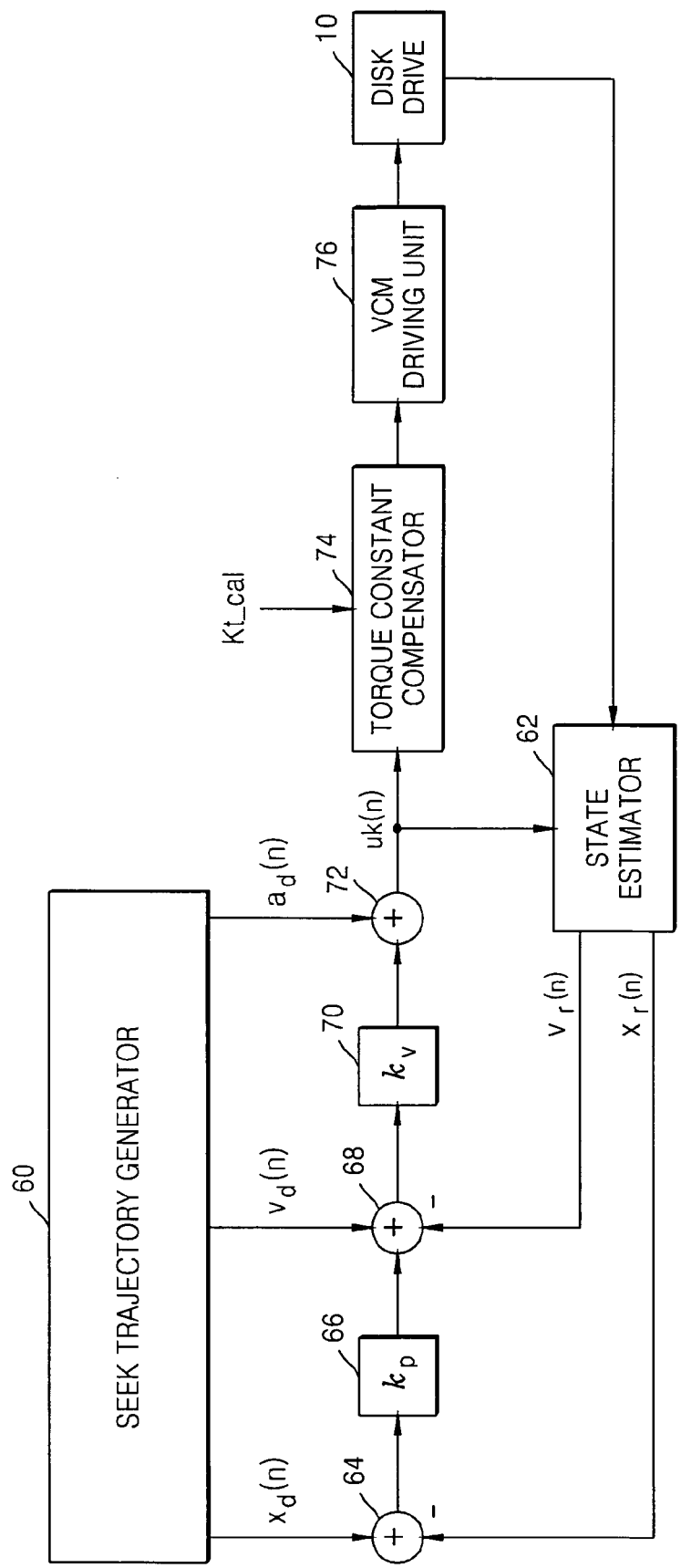
FIG. 3 is a circuit diagram of a servo control system of the disk drive according to the present invention.

FIG. 3 shows a track seek servo control system constructed with hardware and software executed by the controller 240.

Every time the transducer 16 reads out the gray code of the track 34, a seek trajectory generator 60 generates position and velocity trajectories by integrating sinusoidal velocity and acceleration trajectories and calculates a design position, velocity, and acceleration $x_d(n)$, $v_d(n)$, and $a_d(n)$ from the generated position and velocity trajectories.

A state estimator 62 performs a process for estimating state variable values of head motion including real position and velocity information by using an well-known equation from a position error signal and a control signal $u_k$.

A first summing unit 64 subtracts the real position value $x_r(n)$ from the design position value $x_d(n)$. A position control gain compensator 66 multiplies the difference between the real position value $x_r(n)$ and the design position value $x_d(n)$ (calculated by the first summing unit 64) with the position-correction gain $k_p$ to generate a position correction value Next, a second summing unit 68 adds the design velocity value $v_d(n)$ to the position correction value generated by the position control gain compensator 66 and subtracts the real velocity value $v_r(n)$ from the resulting value.

Next, a velocity control gain compensator 70 multiplies the value calculated by the second summing unit 68 with a velocity-correction gain $k_v$ to generate a velocity correction value.

Next, a third summing unit 72 adds the velocity correction value to the design acceleration value to generate a seek driving current control value $u_k(n)$.

A torque constant compensator 74 multiplies the seek driving current control value $u_k(n)$ with a torque constant value according to a variation in a torque of the disk drive to generate a torque-corrected seek driving current control value and applies the torque-corrected seek driving current control value to the VCM driving unit 76. The VCM driving unit 76 applies a current corresponding to the torque-corrected seek driving current control value to the VCM 30 of the disk drive 10 to rotate, so that the transducer 16 is moved by rotation of the VCM 30.

In a sinusoidal seek servo algorithm, as an example of a seek servo algorithm according to the present invention, the position, velocity, acceleration, and current trajectories are obtained by using Equation 1.

$$x(t) = K_A I_M \frac{T_{SK}}{2\pi}\left[t - \frac{T_{SK}}{2\pi}\sin\left(\frac{2\pi}{T_{SK}}t\right)\right]. \quad \text{[Equation 1]}$$

$$v(t) = K_A I_M \frac{T_{SK}}{2\pi}\left[1 - \cos\left(\frac{2\pi}{T_{SK}}t\right)\right]$$

$$a(t) = K_A I_M \sin\left(\frac{2\pi}{T_{SK}}t\right)$$

$$i(t) = I_M \sin\left(\frac{2\pi}{T_{SK}}t\right)$$

Here, $T_{SK}$, $I_M$, and $K_A$ denote a seek time, a maximum current applied to a voice coil, and an acceleration constant, respectively.

For a given seek length $X_{SK}$, the time t is equal to the seek time $T_{SK}$, so that Equation 2 is obtained as follows.

$$X_{SK} = x(T_{SK}) = K_A I_M \frac{T_{SK}^2}{2\pi} \quad \text{[Equation 2]}$$

By solving Equation 2 with respect to $T_{SK}$, the seek time $T_{SK}$ for the given seek length $X_{SK}$ is represented by Equation 3.

$$T_{SK} = \sqrt{\frac{2\pi X_{SK}}{K_A I_M}} \quad \text{[Equation 3]}$$

Equation 3 shows that the generated sinusoidal seek trajectory is limited by the constant current $I_M$ applied to the VCM 30. However, in a real case, the seek time (determining seek performance) is changed according to a variation in the power supply voltage.

Therefore, in the present invention, the seek control routine is designed according to the variation in the power supply voltage in order to obtain optimal seek performance as follows.

First, the voltage applied to the VCM 30 is represented by Equation 4.

$$V_s = L_{VCM}\frac{di}{dt} + R_{VCM} \cdot i + K_e \cdot \omega \quad \text{[Equation 4]}$$

Here, $V_S$, i, $L_{VCM}$, $R_{VCM}$, $K_e$, and ω are a voltage applied to the VCM 30, a current of the VCM 30, an inductance of the VCM 30, a resistance of the VCM 30, a reverse electro motive force constant, and an angular velocity of the VCM 30, respectively.

In an ideal case, an instantaneous maximum voltage value $V_M$ of the voltage trajectory is needed to accurately follow the trajectory (given by Equation 1) and perform movement of the seek length $X_{SK}$ for the seek time $T_{SK}$ using Equations 1 and 4. The instantaneous maximum value $V_M$ is represented by Equation 5.

$$V_M(X_{SK}, T_{SK}) \equiv \max_{(0,T_{SK})} V(t) \quad \text{[Equation 5]}$$

$$= K_e \frac{X_{SK}}{T_{SK}} +$$

$$\sqrt{\left(\frac{2\pi R_{VCM}X_{SK}}{K_A T_{SK}^2}\right)^2 + \left(\frac{4\pi^2 L_{VCM}X_{SK}}{K_A T_{SK}^3} - \frac{K_e X_{SK}}{T_{SK}}\right)^2}$$

Figure 5:
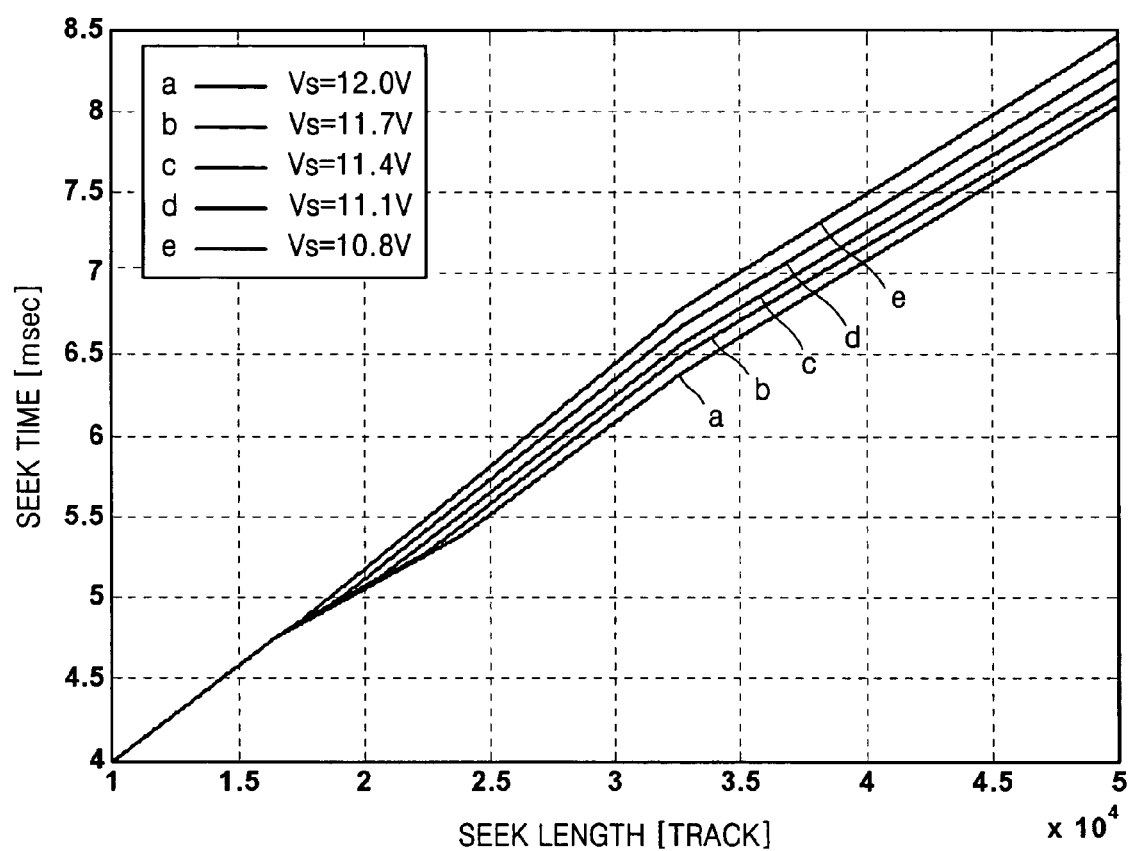
FIG. 5 is a graph showing a relation between a seek time and a seek length according to the variation in the supply voltage for the disk drive according to the present invention.

In FIG. 5, the voltage $V_M$ is also a minimum voltage necessary to perform movement of the seek length $X_{SK}$ for the seek time $T_{SK}$. However, in a real case, a required minimum voltage has a marginal voltage $V_{mgn}$ in terms of implementation convenience and modeling error. On the other hand, in case of a seek length $X_{SK}$ given under the supply voltage limitation $V_{max}$, a minimum seek time $T_{SK}$ in the sinusoidal seek scheme can be determined by using Equation 6.

$$V_M(X_{SK}, T_{SK}) = V_{max} - V_{mgn} \quad \text{[Equation 6]}$$

FIG. 5 is a graph showing a relation between the seek time and the seek length under a supply voltage limitation determined by Equations 5 and 6 in case of a typical 3.5 inch hard disk drive. As shown in FIG. 5, it can be understood that the minimum seek time increases as the supply voltage limitation decreases. In turn, it can be understood that, as the seek time for the equal seek length decreases, the required voltage increases.

In general, a disk drive should be designed to have an input voltage tolerance of +/−10% in terms of various operating environments. In addition, the sinusoidal seek scheme should designed by using a minimum supply voltage. Therefore, in a conventional method, the seek time increases under a standard supply voltage. However, the shortcomings of the conventional method can be overcome by using a seek servo control method according to the present invention.

Figure 4:
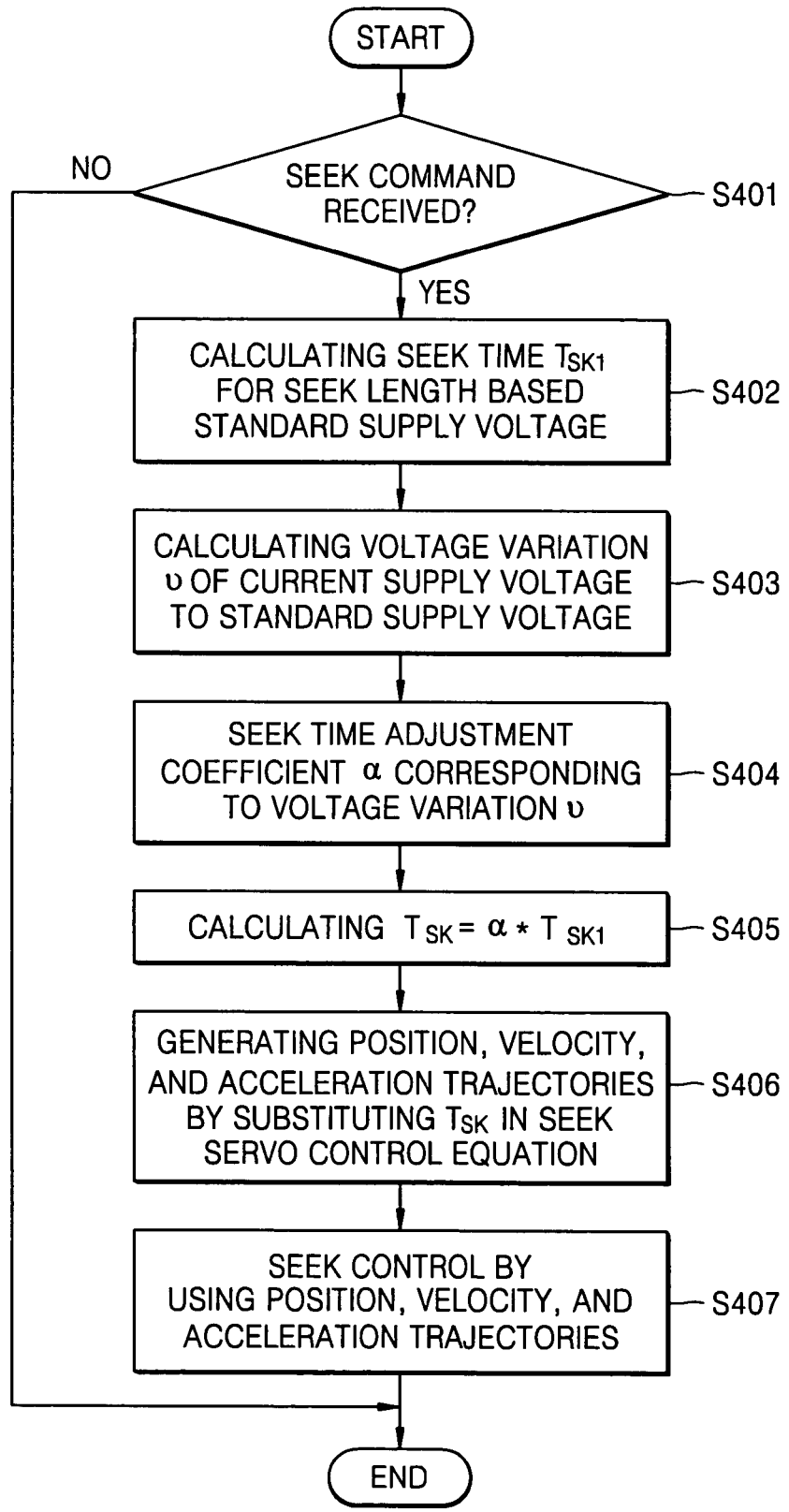
FIG. 4 is a flowchart of a seek servo control method coping with a variation in a supply voltage according to the present invention.

The seek servo control method according to the present invention will be described in detail with reference to a flowchart of FIG. 4. The seek servo control method is performed according to a variation in the supply voltage.

First, a first table listing a relation between a seek time and a seek length based on a standard supply voltage and a second table listing a relation between a seek time adjustment ratio and a supply voltage are designed and stored in the ROM 250A.

More specifically, in a sinusoidal seek scheme having a standard supply voltage Vo as a voltage limitation, a reference trajectory is obtained by using Equation 1. The first table stored in the ROM 250A is obtained from Equation 3, which represents the relation between the seek length and the seek time.

Since a value of the supply voltage limitation is varied, calculation of the seek time from the seek length is too complicated during disk drive operation with firmware. Therefore, an approximation is used in terms of a variation in the seek time due to a variation in the supply voltage.

Equation 5 may be approximate to Equation 7.

$$V_M(X_{SK}, T_{SK}) \cong \left(\frac{2\pi R_{VCM} X_{SK}}{K_A T_{SK}^2}\right) = R_{VCM} \cdot I_M \quad \text{[Equation 7]}$$

When the supply voltage varies from the standard supply voltage Vo to Vs=Vo+v, a minimum seek time $T_{SK}$ (neces- sary to follow a given seek trajectory without error) can be simply calculated by using Equation 8.

$$T_{SK}(V_o + v) = \sqrt{\frac{1}{1 + \frac{v}{V_o}}} \cdot T_{SK}(V_o) \quad \text{[Equation 8]}$$

An adjustment coefficient a of the seek time (that is, the seek time adjustment ratio) is defined as a ratio of a seek time $T_{SK}$ (Vo+v) at a current supply voltage to a seek time $T_{SK}$ (Vo) at a standard supply voltage. The adjustment coefficient a can be represented by Equation 9.

$$a(v) = \frac{T_{SK}(V_o + v)}{T_{SK}(V_o)} = \sqrt{\frac{1}{1 + \frac{v}{V_o}}} \quad \text{[Equation 9]}$$

Figure 6:
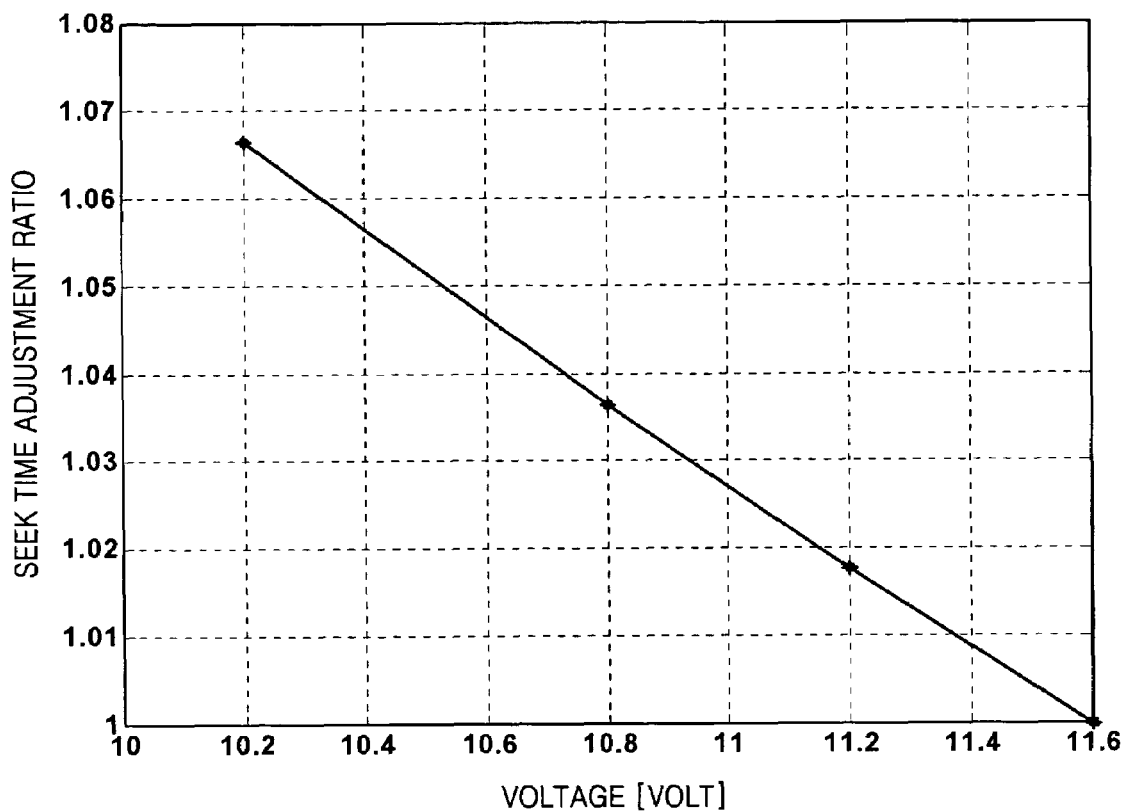
FIG. 6 is a graph showing a seek time adjustment ratio according to the variation in the supply voltage for the disk drive according to the present invention.

The adjustment calculation equation (Equation 5) is listed in the second table stored in the ROM 250A. The adjustment coefficient a of the seek time (that is, the seek time adjustment ratio) according to a variation in the supply voltage is shown in FIG. 6.

The first and second tables may be stored in the ROM 250A at a disk drive design stage.

Now, execution of the seek servo control process according to the present invention will be described.

The controller 240 determines whether or not a seek command is received from the host system (not shown) through the host interface 260 (S401).

When the seek command is determined to have been received, a seek time $T_{SK1}$ for a given seek length is calculated by using the first table determined based on a standard supply voltage (S402).

Next, a difference voltage v between a standard supply voltage Vo and a current supply voltage (detected by a voltage detector 280) is calculated (S403).

Next, an adjustment coefficient a of a seek time (that is, a seek time adjustment ratio) corresponding to the difference voltage v is calculated by using the second table (S404).

Next, a final seek time $T_{SK}$ for a seek length according to a supply voltage is calculated by using Equation 10.

$$T_{SK} = a \cdot T_{SK1} \quad \text{[Equation 10]}$$

Next, position, velocity, and acceleration trajectories according to the final seek time $T_{SK}$ are obtained by using Equation 1 (S406). Finally, the seek control is executed by applying the position, velocity, and acceleration trajectories to the seek servo control system shown in FIG. 3 (S407).

According to the present invention, a seek time is adaptively adjusted according to a variation in a supply voltage for a disk drive, and a seek servo control is performed based on the adjusted seek time, so that a seek servo control corresponding to the supply voltage can be optimally performed. As a result, it is possible to improve seek control performance for the disk drive.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A seek servo control method for a disk drive, comprising:
    detecting a supply voltage for the disk drive; and
    adjusting a seek time according to a track seek length based on the detected supply voltage,
    wherein the adjusting the seek time comprises:
        calculating a seek time adjustment ratio corresponding to a difference between the detected supply voltage and a predetermined standard supply voltage obtained from a table listing a relation between the supply voltage and the seek time adjustment ratio: and
        adjusting the seek time by multiplying the seek time adjustment ratio and a standard seek time determined according to the seek length based on the standard supply voltage.

2. The seek servo control method according to claim 1, wherein the supply voltage includes a voltage supplied to a voice coil motor.

3. The seek servo control method according to claim 1, wherein the standard seek time is calculated from a table listing a relation between the seek length and the seek time based on the standard supply voltage.

4. A sinusoidal seek control method for a disk drive for adapting to a variation in a supply voltage for the disk drive, comprising:
    calculating a standard seek time based on a predetermined standard supply voltage according to a seek length in response to a seek command;
    calculating the variation in the supply voltage currently supplied to the disk drive with reference to the standard supply voltage;
    calculating a seek time adjustment ratio corresponding to the calculated variation in the supply voltage from a table listing a relation between the supply voltage and the seek time adjustment ratio;
    calculating a final seek time by multiplying the seek time adjustment ratio and the standard seek time;
    generating position, velocity and acceleration trajectories by substituting the final seek time in a sinusoidal seek servo equation; and
    performing track seek control by using the generated position, velocity and acceleration trajectories.

5. The seek servo control method according to claim 4, wherein the supply voltage includes a voltage supplied to a voice coil motor.

6. The seek servo control method according to claim 4, wherein the standard seek time is calculated from a table listing a relation between the seek length and the seek time based on the standard supply voltage.

7. A disk drive comprising:
    a disk storing information;
    a spindle motor rotating the disk;
    a transducer writing and reading information to or from the disk;
    a voice coil motor moving the transducer;
    a voltage detection unit detecting a supply voltage for the disk drive; and
    a controller adjusting a seek time according to a track seek length based on a voltage detected by the voltage detection unit in a track seek mode and applying the adjusted seek time to a track seek control routine to control a driving current for the voice coil motor,
    wherein the controller calculates a seek time adjustment ratio corresponding to a difference between a predetermined standard supply voltage and the detected voltage from a table listing the seek time adjustment ratio according to a variation in the supply voltage and adjusts the seek time by multiplying the seek time adjustment ratio and the standard seek time determined according to the seek length based on the standard supply voltage.

8. The disk drive according to claim 7, wherein the voltage detection unit detects a voltage supplied to the voice coil motor.

9. A disk drive using a sinusoidal seek serve scheme, comprising:
    a disk storing information;
    a spindle motor rotating the disk;
    a transducer writing and reading information to or from the disk;
    a voice coil motor moving the transducer;
    a voltage detection unit detecting a supply voltage for the disk drive;
    a memory storing a first table listing a relation between a seek length and a seek time based on a predetermined standard supply voltage and a second table listing a relation between a supply voltage and a seek time adjustment ratio; and
    a controller, the controller determining the standard seek time by using the first table according to the seek length based on the standard supply voltage; determining the seek time adjustment ratio corresponding to a difference between the standard supply voltage and the detected supply voltage by using the second table; calculating a final seek time by multiplying the determined seek time adjustment ratio and the determined standard seek time; and controlling a driving current for the voice coil motor by using position, velocity and acceleration trajectories generated based on the final seek time.

10. The disk drive of claim 9 wherein the voltage detection unit detects a voltage supplied to the voice coil motor.

11. The disk drive of claim 9, further comprising a voice coil motor driving unit.

12. The disk drive of claim 11, wherein the supply voltage is a power supply voltage for the voice coil motor driving unit.

13. A computer-readable medium having a computer program code for adjusting a seek time according to a track seek length based on a supply voltage for a disk drive and executing a seek control routine with the adjusted seek time,
    wherein the adjustment of the seek time is performed by a process for:
        calculating a seek time adjustment ratio corresponding to a difference between a supply voltage currently supplied to the disk drive and a predetermined standard supply voltage from a table listing a relation between the supply voltage and the seek time adjustment ratio; and
        multiplying the seek time adjustment ratio and the standard seek time determined according to the seek length based on the standard supply voltage.

* * * * *

UNITED STATES PATENT AND TRADEMARK OFFICE
CERTIFICATE OF CORRECTION

| | |
|---|---|
| PATENT NO. | : 7,333,292 B2 |
| APPLICATION NO. | : 11/339677 |
| DATED | : February 19, 2008 |
| INVENTOR(S) | : Sang-hoon Chu et al. |

It is certified that error appears in the above-identified patent and that said Letters Patent is hereby corrected as shown below:

Column 9, Line 12, change "ratio:" to --ratio;--

Column 10, Line 39, change "claim 9" to --claim 9,--.

Signed and Sealed this

Twenty-ninth Day of July, 2008

JON W. DUDAS
*Director of the United States Patent and Trademark Office*